(12) United States Patent
Chefetz et al.

(10) Patent No.: US 12,733,628 B1
(45) **Date of Patent: *Sep. 15, 2026**

(54) PET LEASH

(71) Applicant: Wigzi, LLC, Arlington, VA (US)

(72) Inventors: Nathan Chefetz, Kensington, MD (US); Cade Goldenberg, Great Falls, VA (US)

(73) Assignee: WIGZI, LLC, Arlington, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 19/307,336

(22) Filed: Aug. 22, 2025

Related U.S. Application Data

(63) Continuation of application No. 19/235,300, filed on Jun. 11, 2025, now Pat. No. 12,414,547.

(51) Int. Cl.
*A01K 27/00* (2006.01)
*B65H 75/44* (2006.01)

(52) U.S. Cl.
CPC ....... *A01K 27/004* (2013.01); *B65H 75/4442* (2013.01)

(58) Field of Classification Search
CPC .... A01K 27/004; A01K 27/003; A01K 27/00; B65H 75/4442
See application file for complete search history.

(56) References Cited

U.S. PATENT DOCUMENTS 6,792,893 B1 * 9/2004 Quintero .............. A01K 27/004 119/796
7,207,296 B2 4/2007 DiDonato
7,455,034 B2 11/2008 DiDonato
7,559,292 B2 7/2009 Blandford
7,980,202 B2 7/2011 Bentz et al.
8,256,385 B2 9/2012 Goldenberg
2011/0067649 A1 * 3/2011 O'Brien ............... A01K 27/004 119/796
2011/0180017 A1 * 7/2011 Goldenberg ......... A01K 27/004 119/796
2014/0238314 A1 * 8/2014 O'Brien ............... A01K 27/004 119/796

* cited by examiner

*Primary Examiner* — Kristen C Hayes
(74) *Attorney, Agent, or Firm* — Sterne, Kessler, Goldstein & Fox P.L.L.C

(57) ABSTRACT

A twin pet leash prevents tangling by permitting the reel portion to rotate relative to the handle portion, and features individually controllable leash stop mechanisms. Even while an individual leash is stopped, the reel portion can rotate relative to the handle portion so that tangling of the pet leashes is avoided. The leash handle portion has two triggers that are color coded to match the color of the leash, so that a user can readily identify which of the two leashes are to be stopped. A ball bearing and/or a point contact reduces rotational friction on the reel portion while one or both of the brakes are activated.

13 Claims, 10 Drawing Sheets

110
200
290
500
503
505
120
503
502
100

PET LEASH

CROSS-REFERENCE TO RELATED APPLICATION

The present application is a continuation of U.S. patent application Ser. No. 19/235,300, filed Jun. 11, 2025, now allowed, which is incorporated herein by reference in its entirety.

BACKGROUND

This disclosure relates to the field of pet leashes. Specifically, this disclosure is related to a dual, retractable pet leash that prevents tangling by permitting the reel portion to rotate relative to the handle portion, and features individually controllable leash stop mechanisms Retractable pet leashes function by wrapping a leash around a reel that includes a mechanism that automatically rotates the reel to retract the leash. These leashes typically have a single reel with a single trigger mechanism for controlling the stopping of the reel. Single leash units having two leashes are known, for walking two pets at the same time. When pets pull on their leash, unwinding of a reel occurs; however sometimes the leash must be stopped from unwinding further, for example to prevent a pet from running into traffic or to prevent the pet from approaching another animal or human. Some leashes incorporate two reels allow a user to individually control each leash while including a rotation mechanism that reduces the potential for tangling. The disclosure below describes improvements to such dual leash reels, specifically regarding the rotation mechanism.

BRIEF SUMMARY

In a first embodiment, a pet leash includes a handle configured to be held by a user; a first trigger disposed on the handle and positioned to be actuated by the user; and a second trigger disposed on the handle and positioned to be actuated by the user. A reel casing is rotatably connected to the handle, with a first reel disposed in the reel casing and having a first leash wrapped around the first reel and a second reel disposed in the reel casing and having a second leash wrapped around the second reel. A brake is rotatably disposed in the handle and extending into the reel casing, the brake including a first brake member slidably disposed in the brake such that the first brake member can slide into and out of contact with the first reel in the reel casing and a second brake member slidably disposed in the brake such that the second brake member can slide into and out of contact with the second reel in the reel casing. A first actuator arm is pivotably mounted in the handle and linked to the first trigger such that movement of the first trigger pivots the first actuator arm, wherein the first actuator arm is configured to pivot to displace the first brake member towards the first reel. A ball bearing is disposed at an end of the first actuator arm and positioned to contact the first brake member when the first actuator arm pivots to displace the first actuator arm. A second actuator arm is pivotably mounted in the handle and linked to the second trigger such that movement of the second trigger pivots the second actuator arm, wherein the second actuator arm is configured to pivot to displace the second brake member towards the second reel. A contact member is disposed at an end of the second actuator arm and positioned to contact the second brake member when the second actuator arm pivots to displace the first actuator arm.

In a further embodiment, the first actuator arm is configured to position the ball bearing such that an outer surface of the ball bearing is parallel to a surface of the first brake member that is in contact with the ball bearing.

In a further embodiment, the first actuator arm is configured to position the ball bearing such that an outer surface of the ball bearing is not parallel to a surface of the first brake member that is in contact with the ball bearing.

In a further embodiment, the ball bearing comprises a curved outer surface such that the contact between the first brake member and the ball bearing contacts the curved outer surface.

In a further embodiment, a contact surface of the first brake member that contacts the ball bearing is an annular surface.

In a further embodiment, the first actuator arm is configured to bring a rotational axis of the ball bearing parallel to a radial direction of the annular surface of the first brake member when the ball bearing contacts the annular surface.

In a further embodiment, the contact member comprises a spherical element fixed to the end of the second actuator arm.

In a further embodiment, the pet leash includes a wear element positioned on the second brake member at the location of contact between the second brake member and the contact member, wherein the wear element is configured to reduce wear of the second brake member caused by the contact member.

In a further embodiment, the wear element comprises a metal disk that is fixed to a surface of the second brake member.

In a further embodiment, the contact member is configured to create a point of contact between the second actuator arm and the second brake member.

Certain aspects of the disclosure have other steps or elements in addition to or in place of those mentioned above. The steps or elements will become apparent to those skilled in the art from a reading of the following detailed description when taken with reference to the accompanying drawings.

BRIEF DESCRIPTION OF THE DRAWINGS/FIGURES

The accompanying drawings, which are incorporated herein and form a part of the specification, illustrate the present disclosure and, together with the description, further serve to explain the principles thereof and to enable a person skilled in the pertinent art to make and use the same.

In the drawings, like reference numbers generally indicate identical or similar elements. Additionally, generally, the left-most digit(s) of a reference number identifies the drawing in which the reference number first appears.

DETAILED DESCRIPTION

Reference will now be made in detail to representative embodiments illustrated in the accompanying drawings. References to "one embodiment," "an embodiment," "an exemplary embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such a feature, structure, or characteristic in connection with other embodiments whether or not explicitly described.

Figures 1, 2, 3:
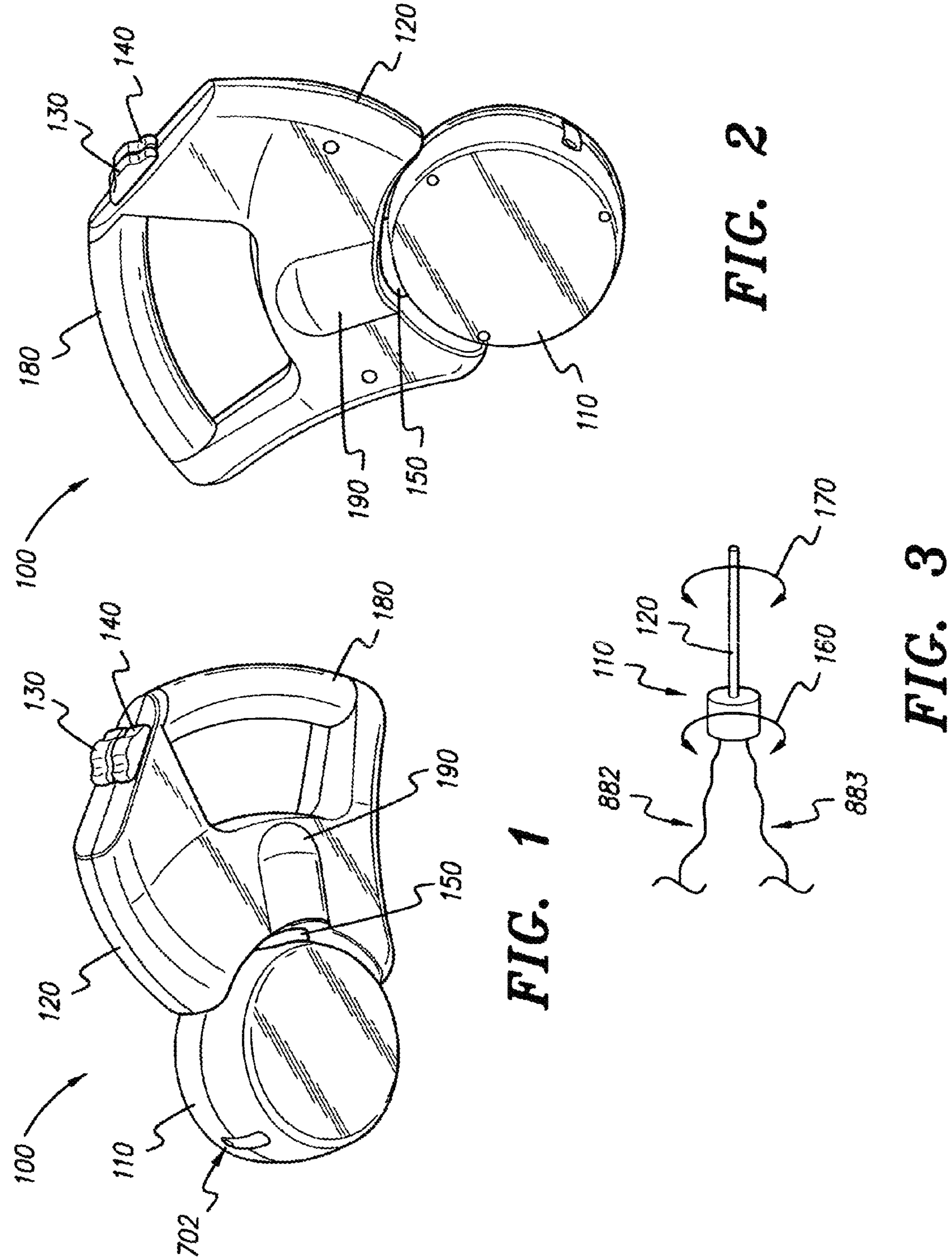
FIG. 1 is a perspective view of a dual retractable pet leash with ability to stop pets individually, according to the present invention.
FIG. 2 is a perspective view from the side of the pet leash of FIG. 1.
FIG. 3 is a simplified schematic view showing the relative rotation of the two main parts of the leash of FIG. 1, with the two main parts being shown at a ninety degree angle to each other.

FIG. 1 is a perspective view of a dual retractable pet leash 100 which has the ability to stop unreeling of each one of the leashes individually as well as simultaneously. The leash 100 has a reel portion 110 and a handle portion 120. The handle portion 120 has a grip portion 180, and is connected to the reel portion 110 at a joint 150. A bulge 190 contains the joint portion shown in more detail in FIGS. 6-12. The handle portion 120 carries two trigger members 130 and 140, which separately brake the individual leashes. The reel portion 110 is rotatable continuously relative to the handle portion 120 in either rotational direction about the longitudinal axis of the leash 100 containing the connecting portion 150. Additionally an aperture 702 is shown in the reel portion 110, where one of the two leashes can exit the reel portion 110. The advantages and uses of the leash 100 are as discussed further below.

Single retractable leash devices usually work by having a single reel with a single trigger mechanism for controlling the stopping of the reel. Single leash units having two leashes for walking two pets at the same time can be used to restrain multiple pets. When pets pull on their leash, unwinding of a reel occurs; however sometimes the leash must be stopped from unwinding further, for example to prevent a pet from running into traffic or to prevent the pet from approaching another animal or human. When two leashes are used in single leash mechanism, both leashes are subject to tangling with one another due to movement of the pets or of the owner, or both. Additionally, the leashes must be capable of being stopped, both for the safety of the pets and control of the pets in general.

The leash 100 according to the present disclosure provides a twin pet leash that prevents tangling by permitting the reel portion 110 to rotate relative to the handle portion 120, and features individually controllable leash stop mechanisms (shown in FIGS. 6-12) actuated by trigger members 130 and 140. Even while an individual leash is stopped, the reel portion 110 can rotate relative to the handle portion 120 so that tangling of the pet leashes is avoided. The leash handle portion 120 has the two triggers 130 and 140 that are preferably color coded to match the color of the corresponding leash that is controls, so that a user can readily identify which of the two leashes are to be stopped. Either or both of the leashes can be stopped or released, without interfering with the operation of the other one of the leashes.

FIG. 2 is a perspective view from the side of the pet leash 100 of FIG. 1. The elements shown in the figure are as described hereinabove with regard to FIG. 1.

FIG. 3 is a simplified schematic view showing the relative rotation of the two main parts of the leash of FIG. 1, namely the reel portion 110 and the handle portion 120 with the two main parts 110 and 120 being shown at a ninety degree angle to each other. A double-headed arrow 160 shows the rotational direction for rotary movement of the reel portion 110. The handle portion 120 can rotate independently as well in the rotational direction shown by the double headed arrow 170. The reel portion 110 is shown with two leashes 882 and 883 extending therefrom. It will be understood that FIG. 3 is merely schematic and greatly simplified for purposes of clarity. It is noted that the reel portion 110 can rotate continuously, with no limit on the number of rotations, without disrupting the ability of the trigger members 130 and 140 to stop the individual leashes; this is shown with respect to FIGS. 6-12 discussed hereunder.

Figures 4, 5:
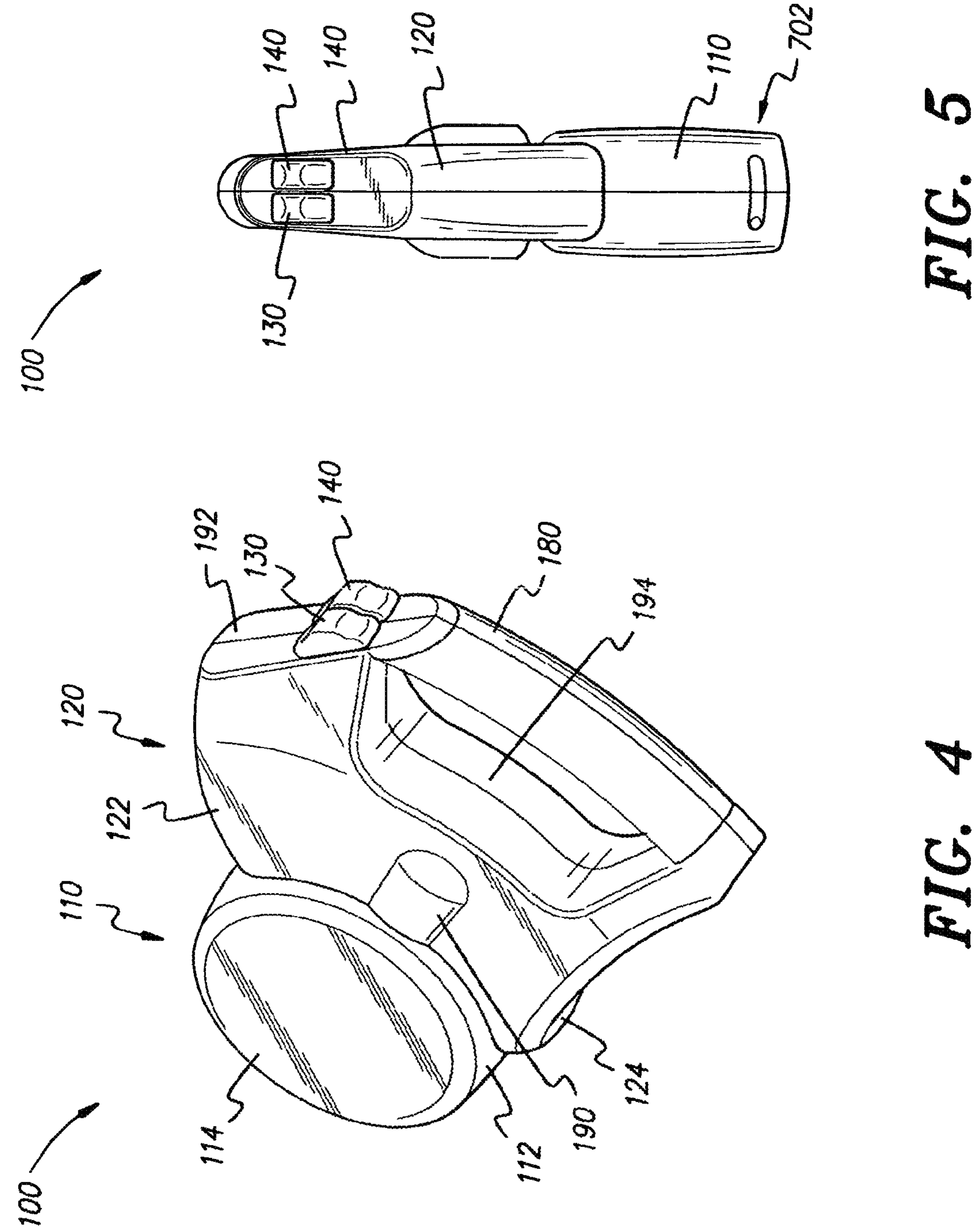
FIG. 4 is a perspective view of the leash of FIG. 1 showing the trigger elements and handle portion and showing the contours of the other parts.
FIG. 5 is an end view of the leash of FIG. 1, showing the trigger portion wherein the handle portion is uppermost and the reel portion is lowermost.

FIG. 4 is a perspective view of the leash 100 of FIG. 1 showing the trigger elements 130 and 140, and the handle portion 120 more clearly, and also showing the contours of the other parts. The elements shown in the figure are as described hereinabove with regard to FIG. 1. Here, a flat surface 114 and a curved periphery 112 of the reel portion 110 is indicated, as well as a flat top wall 112 and a side wall 124 of the handle portion 120. A side wall 192 of the handle portion 120 carries the trigger portions 130 and 140.

FIG. 5 is an end view of the leash of FIG. 1, showing the trigger portion 192 wherein the handle portion 120 is disposed in an uppermost position and the reel portion 110 is lowermost. The elements shown in the figure are as described hereinabove with regard to FIG. 1.

Figure 6:
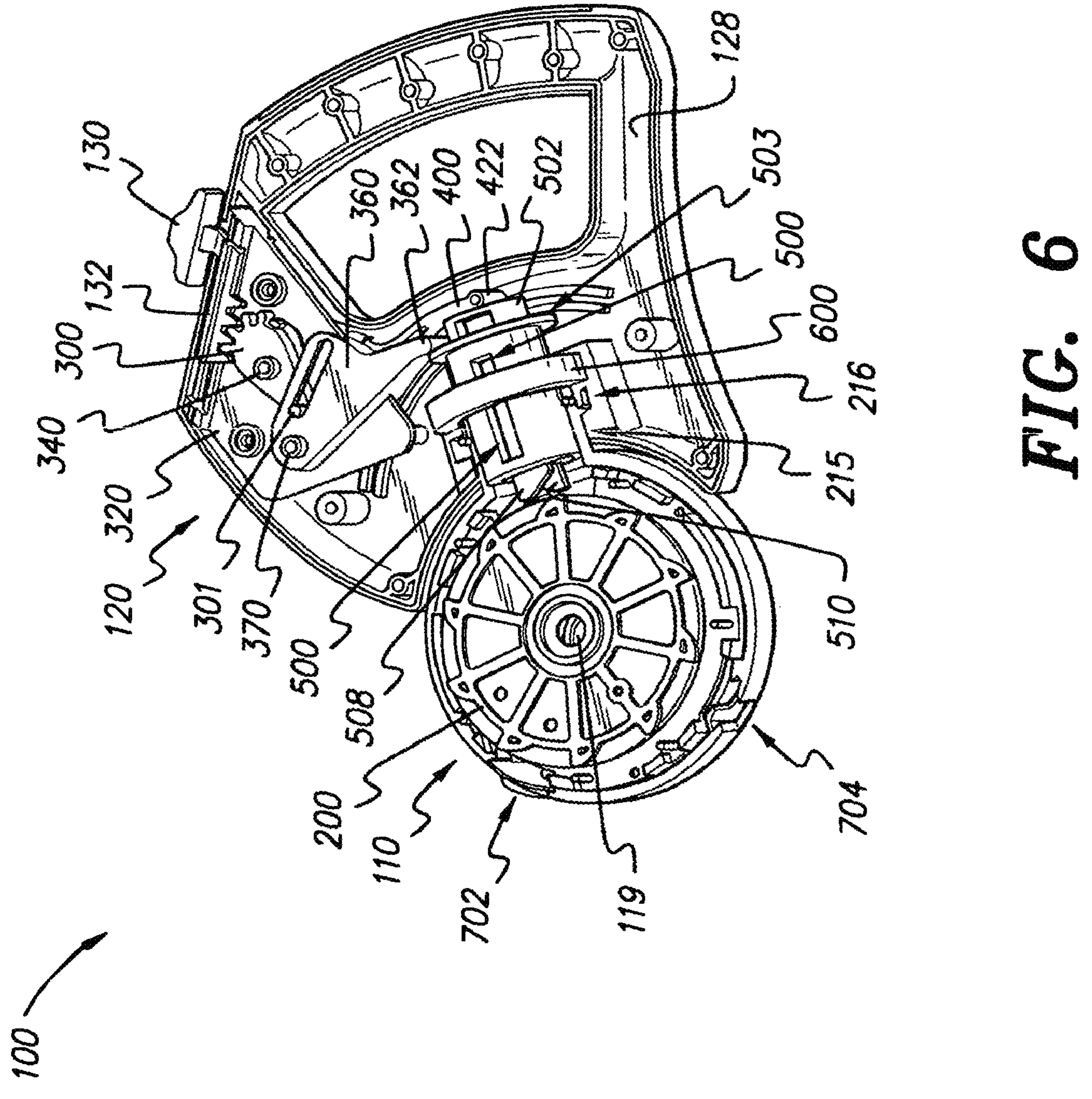
FIG. 6 is a perspective view of the interior portion of the leash of FIG. 1, showing the main operating parts and the reels.

FIG. 6 is a perspective view of the interior portion of the leash 100 of FIG. 1, showing the main operating parts and the reels, which are described in detail as follows. The trigger 130 has a cogged arm 132 which engages with the teeth of a pivoting actuator 300 which pivots about a post 340.

A support wall 320 is shown which supports the elements shown mounted thereon as described hereunder. The support wall 320 has similar elements mounted on the other side thereof for use with the trigger member 140 (not shown in FIG. 6).

The actuator 300 has an end with a projecting pin 301 which engages a slot formed in a brake actuator 360.

The actuator 360 is pivotably mounted about a pin 370 to cause movement of an actuator aim portion 362 into and out of engagement with an outer, annularly-shaped outer member 503 of a braking mechanism 500. Another actuator 400 is similarly mounted by similar elements (not shown) on the other side of the support wall 320, the actuator 400 having an extended arm portion 422, engages a central, cylindrically-shaped member 502 of the braking mechanism 500.

The actuators 400 and 360 cause linear movement respectively of the elements 502 and 503 which cause braking of the reels in the manner discussed hereunder with respect to FIGS. 7-12 below.

The braking mechanism 500 is rotatably secured within a projecting portion 215 having grooves 216 for mounting the mechanism 500 for rotation with the reel portion 110. A bearing 600 is provided for smooth rotation relative to the handle portion 120. The cylindrical member 502 has a distal end 508 which selectively engages notches formed in a reel 200.

As seen in FIG. 6, the reel 200 is rotatable about a central portion 119 which in an assembled condition will be filled by a pin or post member to support rotation of the reel 200 thereabout. The annular portion 503 has a distal end 510 that stops the second reel 290 (shown in FIG. 7). In FIG. 6, the distal portions 508 and 510 are shown in the non-stopped condition. Also, the leash opening 702 is shown as well as a second leash opening 704, so that two separate leashes can extend from the reel portion 110.

Figure 12:
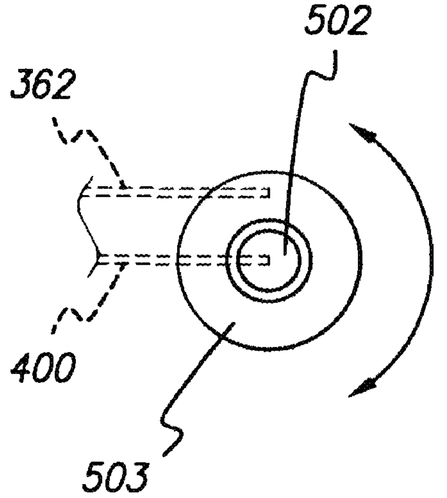
FIG. 12 is a schematic view as seen from the bottom of FIG. 11.

It should be understood that, while the braking mechanism rotates with the reel portion 110, the actuator arms 360 and 400 do not rotate with the braking mechanism 500. Instead, they are positioned so that they simply slide relative to the surfaces with which they are engaged, without interfering with one another, as shown in FIG. 12 hereunder.

Figure 7:
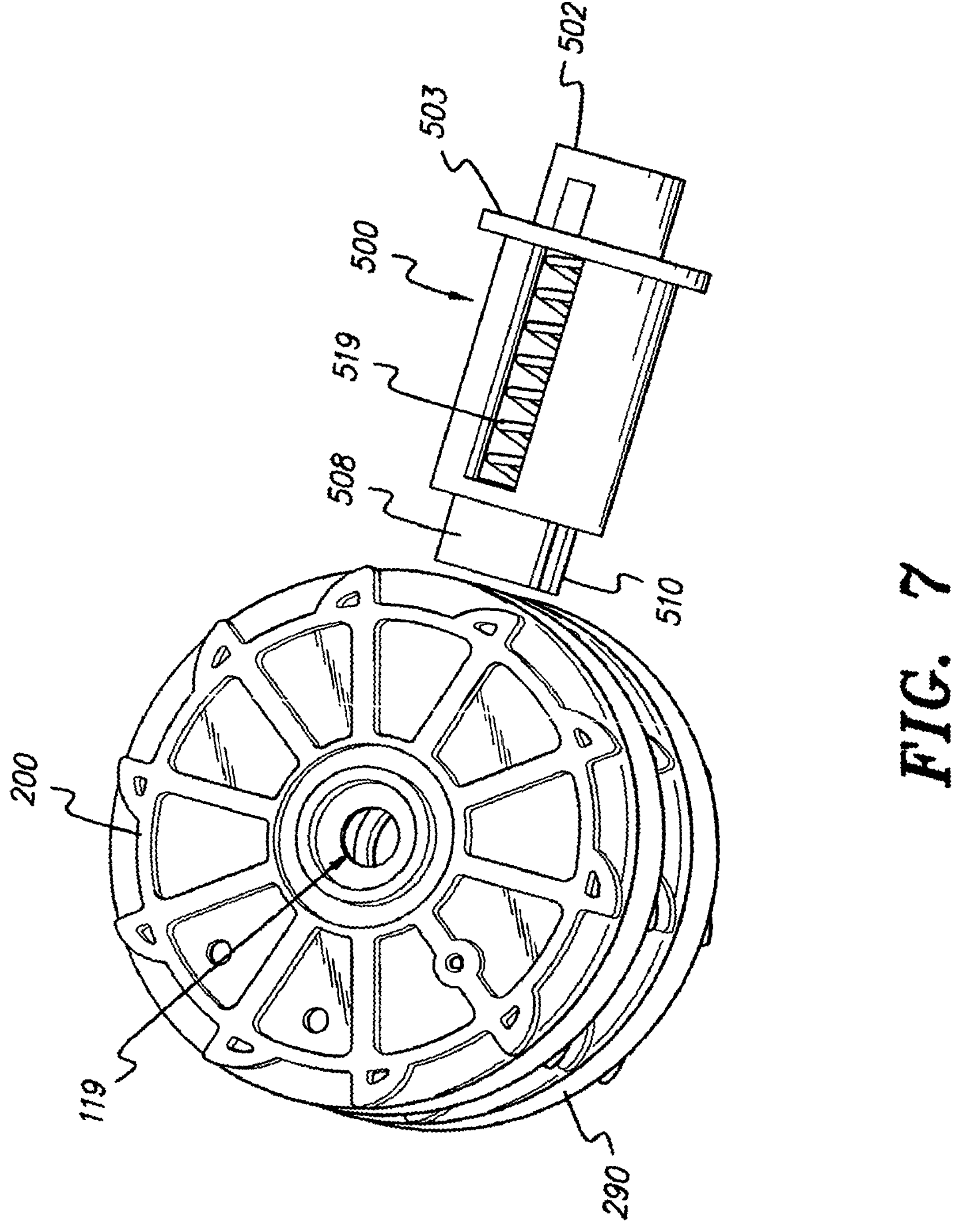
FIG. 7 is a schematic perspective view showing only the reel portion and the portion of the stopping mechanism which engages directly with the reel portion, of the leash of FIG. 1.

FIG. 7 is a schematic perspective view showing only the reels 200 and 290, and stopping mechanism 500. Here, the portion of the stopping mechanism which engages directly with the reel portions are the distal ends 508 and 510, as discussed hereinabove with regard to FIG. 6. A spring element 519 is shown which biases one of the members 502 and 503 into a non-braking position; this is shown in further detail with regard to FIG. 9 discussed below.

Figure 8:
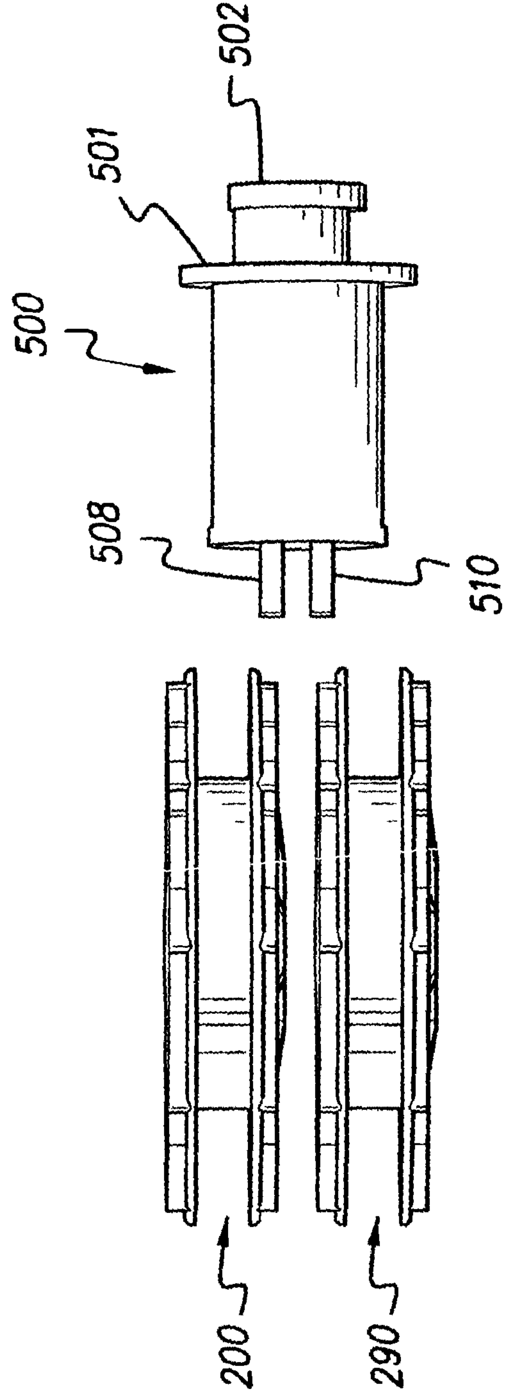
FIG. 8 is a schematic perspective view of the reel portion and stopping mechanism of FIG. 7 as viewed from below FIG. 7.

FIG. 8 is a schematic perspective view of the reels 200 and 290, and stopping mechanism 500 of FIG. 7, as viewed from below FIG. 7. The elements shown in this figure are as described hereinabove with regard to FIG. 7. The distal portion 508 engages notches in the reel 200 to stop it when moved toward the reel 200 and into engagement therewith. Similarly, the distal portion 510 engages notches in the reel 290 to stop it when moved toward the reel 290 and into engagement therewith.

Figure 9:
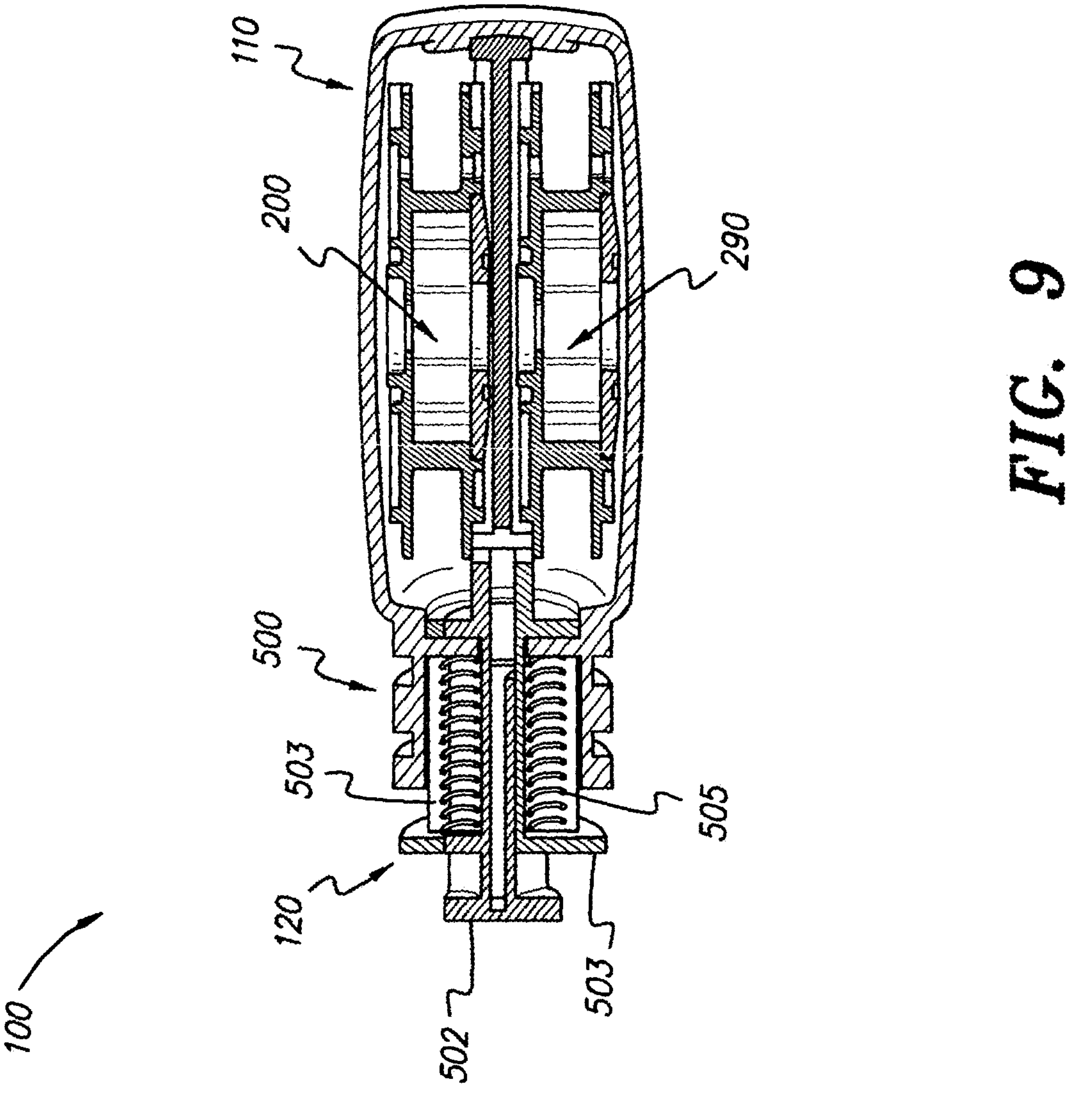
FIG. 9 is a side perspective view of the interior elements of the reel portion, showing the stopping mechanism and springs.

FIG. 9 is a side schematic perspective view of the interior elements of the reel portion 110, showing the stopping mechanism 500 and the spring 503 biasing the central member 502 to a non-engaged position, and another spring 505 biasing the outer cylindrical member 503 to a non-engaged position. The reels 200 and 290 are shown.

Figure 10:
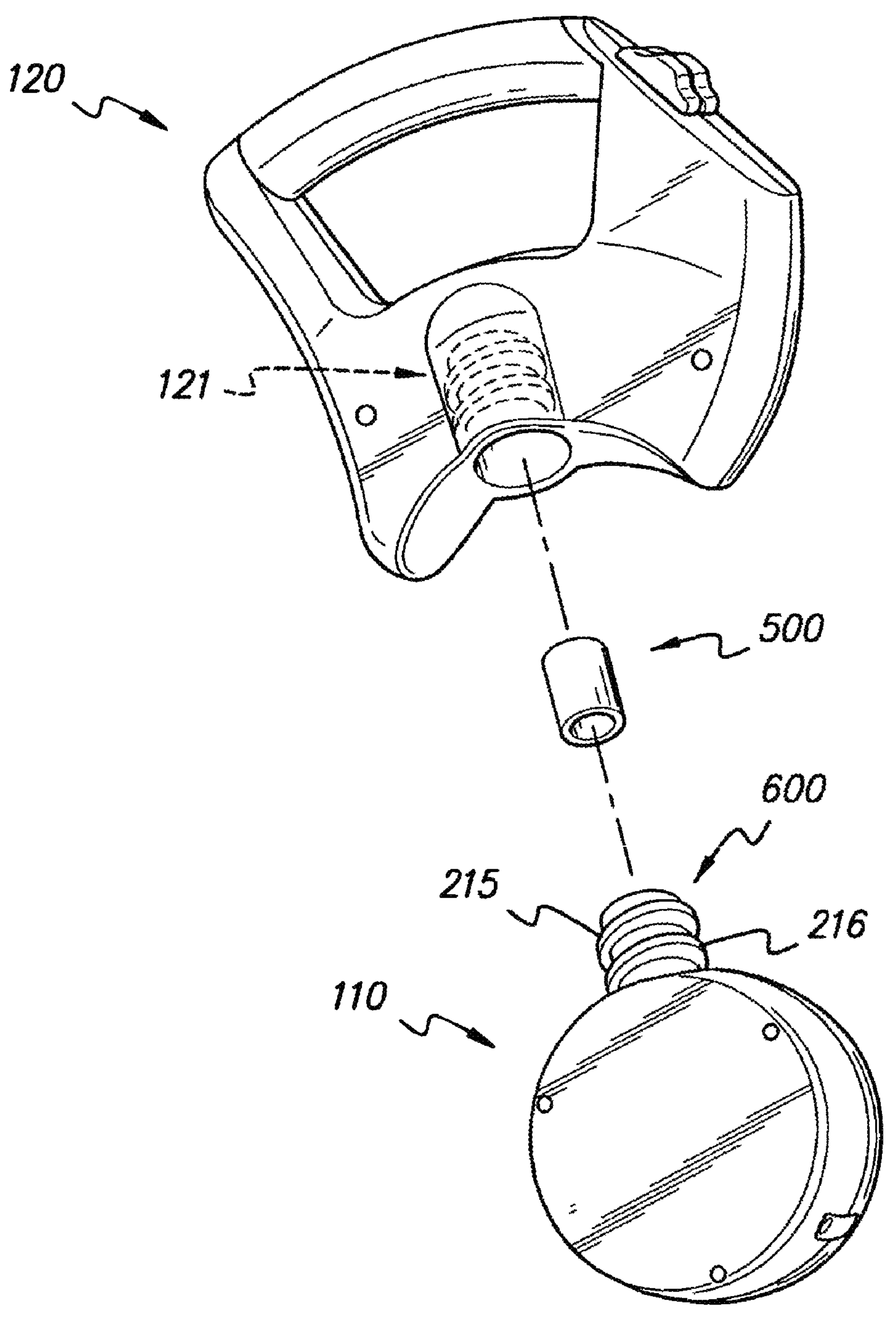
FIG. 10 is a schematic exploded view of the main elements of the present invention.

FIG. 10 is a schematic exploded view of the main elements of the present invention. The reel portion 110 is shown having an extending portion 215 which has ribs 216 and a bearing 600 thereon. More than one bearing can be used, and more ribs could be provided; further, the bearing member can be omitted although this may increase the frictional resistance against rotation between the parts. The braking mechanism 500 is shown, and it fits partially within a recess 121 formed in the handle portion 120 and partially within the interior of the extending portion 215. The ribs 216 and bearing 600 fit within recessed grooves (shown in dashed outline in FIG. 10) in the handle portion 120.

Figure 11:
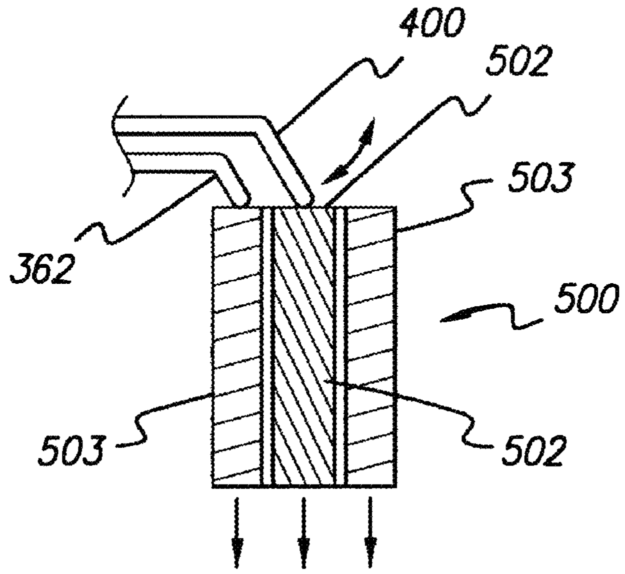
FIG. 11 is an enlarged schematic view showing a section of the stopping mechanism being engaged by two key elements.

FIG. 11 is an enlarged schematic view showing a section of the stopping mechanism 500 being engaged by two key elements 362 and 400. The elements are as discussed hereinabove, and are shown in this simplified diagram for the sake of clarity. The distal portions of the braking mechanism have been omitted for the sake of clarity.

FIG. 12 is a schematic view as seen from the bottom of FIG. 11. This shows the central cylindrical portion 502 and the outer annular portion 503. The dashed outlined elements 362 and 400 show that these elements do not interfere with each other during relative rotation with respect to the members 502 and 503, and the elements 362 and 400 are in sliding engagement therewith regardless of the rotational direction of motion of the braking mechanism 500.

Figure 13:
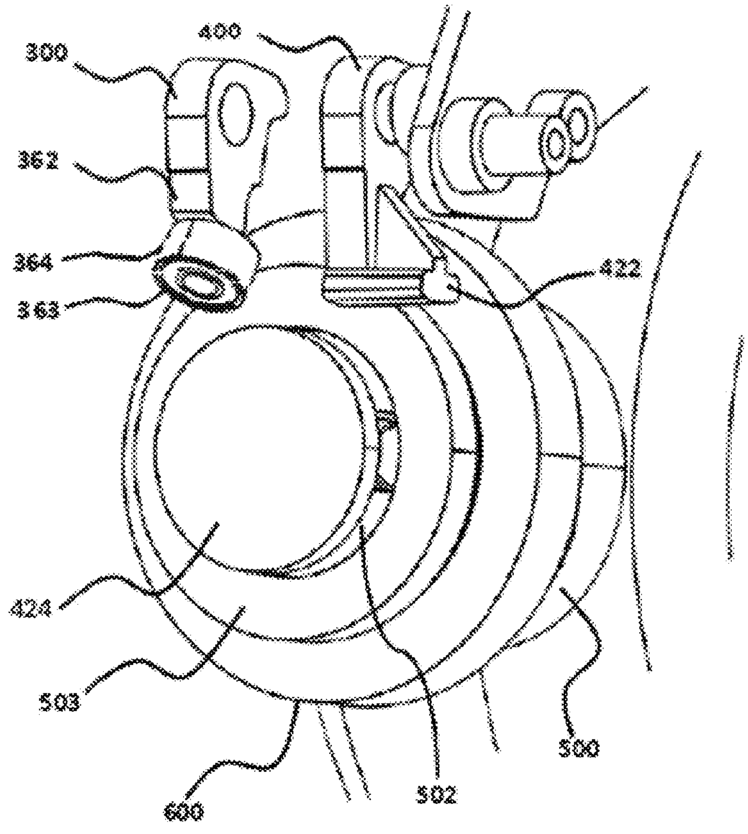
FIG. 13 is a perspective view of the interior portion of an embodiment of the leash of FIG. 1, showing the main operating parts and the reels.

FIG. 13 is a perspective view of the interior portion of an embodiment of leash 100. This embodiment differs from the embodiment discussed above in the way in which actuators 300 and 400 contact outer member 503 and cylindrically-shaped member 502, respectively. Actuators 300 and 400 are pivotably mounted and actuated by triggers 130 and 140 as discussed above. In this embodiment, actuator arm portion 362 is configured to mount a ball bearing 363 such that ball bearing 363 is brought into contact with outer member 503 when actuator 300 is pivoted. This reduces the friction caused by contact between actuator 300 and outer member 503, which improves the rotational freedom of outer member 503, and therefore rotation of reel 110, when braking is engaged.

Figure 14:
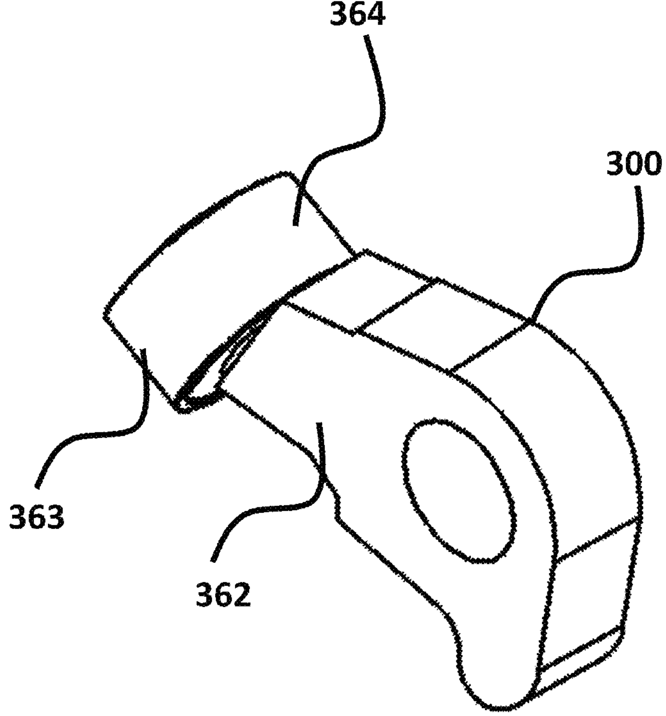
FIG. 14 is a perspective view of certain components of the interior of the reel of FIG. 13.

As seen in FIGS. 13 and 14, the end of actuator arm 362 is shaped to pass through the bore of ball bearing 363 to retain ball bearing 363. In some embodiments, actuator arm 362 can be sized to form a press fit with the bore of ball bearing 363. In other embodiments, ball bearing 363 may be fixed to actuator arm 362 by one or more other techniques, such as adhesives, plastic welding, or mechanical fastening.

In some embodiments, as shown in FIG. 13, actuator arm 362 is shaped to orient ball bearing 363 such that the rotational axis of ball bearing 363 is approximately parallel to a radius of outer member 503 when ball bearing 363 contacts the surface of outer member 503. This means that the flat outer surface 364 of the outer ring of ball bearing 363 will be approximately parallel to the surface of outer member 503 on contact. Further, the rotation of outer member 503 and rotation of ball bearing 363 may be aligned to minimize any friction. This means that the linear contact between bearing 363 and outer member 503 is aligned with the corresponding radius of outer member 503. It should be understood that the pivoting motion of actuator arm 300 means that bearing 363 will not be aligned in this orientation when actuator arm 300 is retracted to its non-braking position.

In other embodiments, actuator arm 362 can orient ball bearing 363 such that outer surface 364 of ball bearing 363 contacts the surface of outer member 503 at an angle. This may be desirable because it can simplify the geometry of actuator arm 362 with respect to accommodating the pivoting motion of actuator arm 300. In these embodiments the rotation of ball bearing 363 and outer member 502 are still aligned as discussed above to minimize friction.

In other embodiments, outer surface 364 of ball bearing 363 may be a curved surface designed to minimize surface contact between ball bearing 363 and outer member 503. For example, outer surface 364 can be a concave surface with a curve that makes the inner portion of outer surface 364 further way from the bore of ball bearing 363 than the outer portions of outer surface 364. This configuration may reduce friction by reducing the contact area between ball bearing 363 and outer member 503. It also can reduce the importance of precise alignment between outer surface 364 and outer member 503 because the contact area will remain relatively consistent through a certain range of angular contact between ball bearing 363 and outer member 503.

In the embodiment of FIG. 13, actuator 400 is the same as the actuator 400 discussed in the embodiments of FIGS. 1-12. In other embodiments, actuator 400 can also be formed to carry a bearing, as discussed above with respect to actuator 300 in FIG. 13. In other embodiments actuator 400 can be shaped is configured such that arm portion 422 creates a point contact with the surface of cylindrically-shaped member 502. Point contact here is intended to refer to a very small region of contact between arm portion 422 and cylindrically-shaped member 502. This type of contact can reduce the friction between arm portion 422 and cylindrically-shaped member 502 when the brake is engaged, which improves rotation of cylindrically-shaped member 502 and reel 110. This point contact can be accomplished by tapering or reducing the cross-section of arm portion 422 to the desired minimum contact area. For example, the end of arm portion 422 that contacts cylindrically-shaped member 502 can be formed in a hemisphere to minimize the contact area. In some embodiments, the tip of arm portion 422 can be configured to mount a contact element 423 to further reduce friction and improve wear resistance. For example, contact element 423 can be a spherical ball made out of a hard-wearing material such as a metal. In these embodiments, contact element 423 can be secured to arm portion 422 through any suitable technique, such as via a press fit or through the use of adhesives.

In these embodiments, arm portion 422 is designed to contact the center of the surface of cylindrically-shaped member 502. This geometry can reduce the importance of rotationally aligning the end of arm portion 422 with the surface of cylindrically-shaped member 502. Embodiments that include a spherical or hemispherical contact element 423 also assist in this aspect because the curved nature of the contacting surface of arm portion 422 can accommodate different angular alignments between arm portion 422 and cylindrically-shaped member 502.

In some embodiments, the surface of cylindrically-shaped member 502 may be designed to improve wear resistance at the contact point with arm portion 422. For example, a wear member 424 can be placed on the surface at the contact point. Wear member 424 may be a thin disc made of wear-resistant material, such as a metal or hard composite. Wear member 424 can be secured to the relevant portion of the surface of cylindrically shaped member 502 by any suitable technique, such as by adhesives. In other embodiments, wear member 424 may be an integral part of cylindrically-shaped member 502, for example as an inset portion of the surface or as a surface coating. In other embodiments, cylindrically-shaped member 502 may be partially or entirely formed from a wear-resistant material, such as a metal, which then eliminates the need for a separate wear member 424.

In other embodiments, the contact between actuators 300 and 400 and their respective members 502 and 503 can use the same technique. For example, both actuators 300 and 400 can use the point contact discussed above with respect to actuator 400, including the wear-resistant techniques as needed. Other embodiments can use a ball bearing for both contact points, as discussed above with respect to actuator 300. In this case actuator 400 would be modified to move the contact point to an outer annular portion of cylindrically-shaped member 502 to reduce contact friction.

While the pins, connections, and support structures shown are exemplary, the present disclosure is not limited thereto. While specific supports are shown, other types can be used, so long as the range of position and the starting and ending positions of the braking mechanism are substantially the same. Also, various suitable resistance elements and spring elements can be used. The support members can be guided in other ways, such as by other types of linkages, or can be connected in other ways to implement the functionality discussed herein. All such variations and embodiments are contemplated as being within the scope of the present disclosure.

It is to be appreciated that the Detailed Description section, and not the Summary and Abstract sections, is intended to be used to interpret the claims. The Summary and Abstract sections may set forth one or more but not all exemplary embodiments of the present invention as contemplated by the inventor(s), and thus, are not intended to limit the present invention and the appended claims in any way. Moreover, the examples described above do not limit the present disclosure to what has been particularly shown and described hereinabove. Rather, the scope of the present disclosure includes both combinations and sub-combinations of the various features described hereinabove, as well as variations and modifications thereof which would occur to persons skilled in the art upon reading the foregoing description and which are not disclosed in the prior art.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

Various features of the invention which are, for clarity, described in the contexts of separate embodiments may also be provided in combination in a single embodiment. Conversely, various features of the invention which are, for brevity, described in the context of a single embodiment may also be provided separately or in any suitable sub-combination.

The breadth and scope of the present invention should not be limited by any of the above-described exemplary embodiments, but should be defined only in accordance with the following claims and their equivalents.

What is claimed is:

1. A pet leash, comprising:

a handle configured to be held by a user;

a first trigger disposed on the handle and positioned to be actuated by the user;

a second trigger disposed on the handle and positioned to be actuated by the user;

a reel casing rotatably connected to the handle;

a first reel disposed in the reel casing and having a first leash wrapped around the first reel;

a second reel disposed in the reel casing and having a second leash wrapped around the second reel;

a brake rotatably disposed in the handle and extending into the reel casing, the brake comprising:

a first brake member disposed in the brake and configured to contact the first reel in the reel casing; and a second brake member disposed in the brake and configured to contact the second reel in the reel casing;

a first actuator arm movably mounted in the handle and linked to the first trigger such that movement of the first trigger moves the first actuator arm, wherein the first actuator arm is configured to move to displace the first brake member towards the first reel;

a ball bearing disposed at an end of the first actuator arm and positioned to contact the first brake member when the first actuator arm moves to displace the first brake member;

a second actuator arm movably mounted in the handle and linked to the second trigger such that movement of the second trigger moves the second actuator arm, wherein the second actuator arm is configured to move to displace the second brake member towards the second reel; and a contact member disposed at an end of the second actuator arm and positioned to contact the second brake member when the second actuator arm moves to displace the second brake member.

2. The pet leash of claim 1, wherein the first actuator arm is configured to position the ball bearing such that an outer surface of the ball bearing is parallel to a surface of the first brake member that is in contact with the ball bearing.

3. The pet leash of claim 1, wherein the first actuator arm is configured to position the ball bearing such that an outer surface of the ball bearing is not parallel to a surface of the first brake member that is in contact with the ball bearing.

4. The pet leash of claim 1, wherein the ball bearing comprises a curved outer surface such that the contact between the first brake member and the ball bearing contacts the curved outer surface.

5. The pet leash of claim 1, wherein a contact surface of the first brake member that contacts the ball bearing is an annular surface, and wherein the first actuator arm is configured to bring a rotational axis of the ball bearing parallel to a radial direction of the annular surface of the first brake member when the ball bearing contacts the annular surface.

6. The pet leash of claim 1, wherein the contact member comprises a spherical element fixed to the end of the second actuator arm.

7. The pet leash of claim 1, further comprising a wear element positioned on the second brake member at a location of contact between the second brake member and the contact member, wherein the wear element is configured to reduce wear of the second brake member caused by the contact member.

8. The pet leash of claim 7, wherein the wear element comprises a metal disk that is fixed to a surface of the second brake member.

9. The pet leash of claim 1, wherein the contact member is configured to create a point of contact between the second actuator arm and the second brake member.

10. The pet leash of claim 1, wherein the first actuator arm is configured to pivot to contact the first brake member, and wherein the second actuator arm is configured to pivot to contact the second brake member.

11. The pet leash of claim 1, wherein the first brake member slides into and out of contact with the first reel, and wherein the second brake member slides into and out of contact with the second reel.

12. The pet leash of claim 1, wherein the first actuator arm comprises a portion configured to be inserted into a bore of the ball bearing and form a press fit with the bore of the ball bearing.

13. The pet leash of claim 1, further comprising a bearing attached to the handle and configured to receive the brake to allow the brake to rotate with respect to the handle.

* * * * *